Jan. 28, 1930.  H. A. DENMIRE  1,744,753
MOLDING DEVICE
Filed Nov. 10, 1927  2 Sheets-Sheet 1
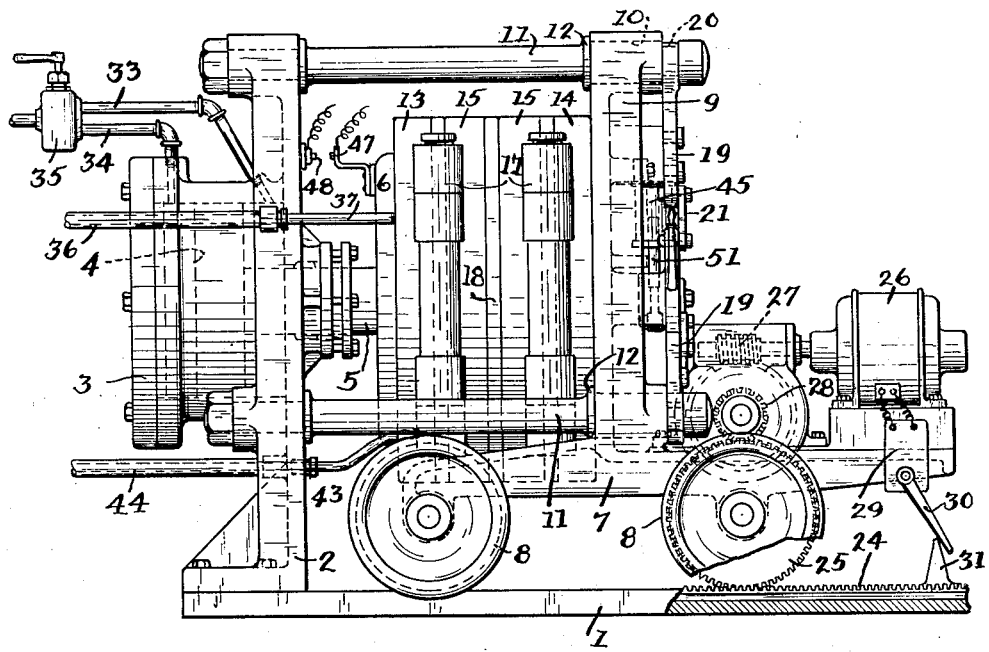
Fig.1.
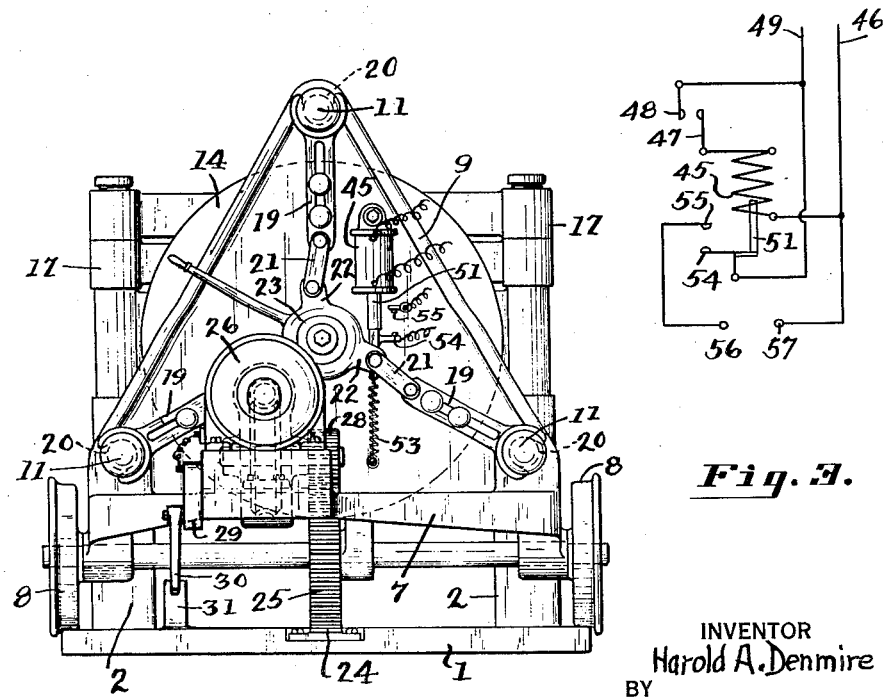
Fig.2.
Fig.3.
INVENTOR
Harold A. Denmire
BY
Evans & McCoy.
ATTORNEYS

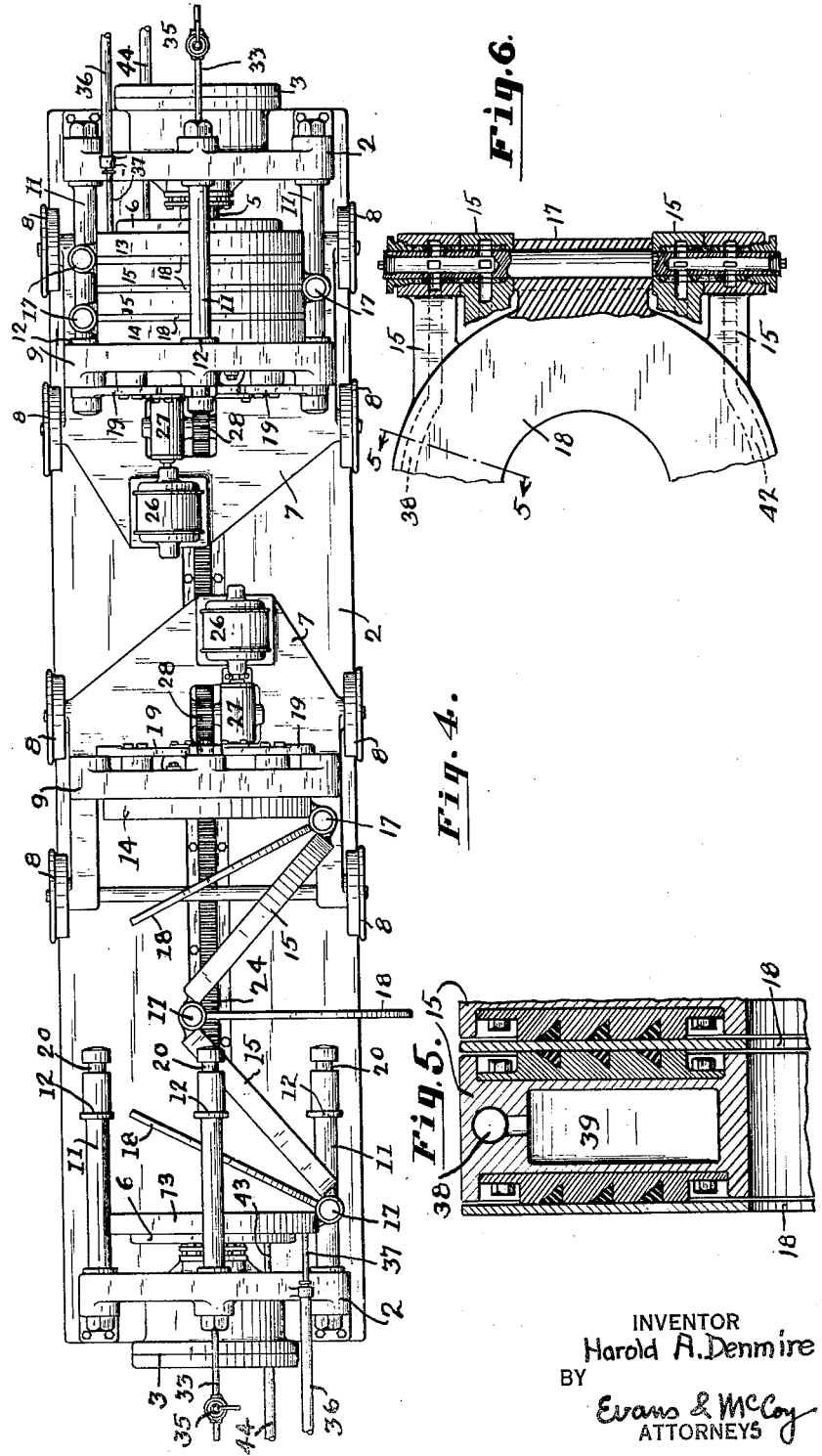

Patented Jan. 28, 1930

1,744,753

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

MOLDING DEVICE

Application filed November 10, 1927. Serial No. 232,222.

This invention relates to molding devices and it has for its object the provision of a vulcanizing heater embodying a plurality of interconnected molds and having means by which the molds may be simultaneously opened in positions convenient for emptying the molds and recharging the same, the mold opening means being operable to return the molds to closed positions.

A further object is to provide on a single support, a pair of vulcanizing heater units so arranged that one may discharge and recharge while articles are being vulcanized in the other.

A further object is to provide a heater unit composed of a series of molds hinged together and having the endmost molds attached to supports which are movable toward and away from each other so that the molds may be simultaneously opened by relative movement of the supports in one direction and simultaneously closed by relative movement of the supports in the opposite direction.

A further object is to provide a heater unit in which means is provided for maintaining pressure on the molds during the vulcanizing operation and in which separate means is provided for moving the molds to open position after the vulcanizing operation is completed and the pressure released.

A further object is to provide vulcanizing apparatus including a pressure applying cylinder, a carriage mounted for movement toward and from the cylinder and a series of hingedly connected molds interposed between the carriage and pressure applying cylinder, together with means for locking the carriage to the support to receive the thrust of the pressure applying means and means actuating the carriage after the pressure is released.

A further object is to provide means whereby the fluid pressure applying means may be employed to positively break open the molds after vulcanization of the enclosed articles and before the actuation of the carriage to move the molds to open position.

A further object is to provide a control system for the carriage-actuating motor that is interlocked with the fluid pressure applying means and with the carriage locking means to render the motor starting means inoperative when the carriage latches are in locking position and to automatically open the molds after release of the molding pressure.

With the above and other objects in view, the invention may be said to comprise the vulcanizing apparatus illustrated in the accompanying drawings hereinafter described and particularly set forth in the appended claims, together with such variations and modifications thereof as will be apparent to one skilled in the art to which the invention appertains.

Reference should be had to the accompanying drawings forming a part of the specification in which Figure 1 is a side elevation of one of the heater units.

Fig. 2 is an end elevation of a heater unit shown in Fig. 1.

Fig. 3 is a wiring diagram showing the electrical connections for the solenoid which operates the carriage lock and the switch operated by the solenoid, by which operation of the motor is prevented, when the carriage locking bars are in operative positions.

Fig. 4 is a plan view showing a pair of heater units mounted at each end of a common supporting platform and so arranged that the molds of one unit may be opened while articles are being vulcanized in the other unit.

Fig. 5 is a fragmentary section showing the construction of one of the molds.

Fig. 6 is a sectional detail view showing the construction of the hinges employed between the molds.

Referring to the accompanying drawings, the vulcanizing apparatus is shown mounted upon an elongated platform 1 which, if desired, may support a heater unit at each end as shown in Fig. 4. The mounting of a pair of heater units upon a single support as shown in Fig. 4 is an economical arrangement, but it is to be understood that the main features of the present invention relate to the construction and operating mechanism embodied in the individual heater units.

The platform 1 is provided with a standard 2 at each end and on each of these standards there is mounted a fluid pressure cylinder 3, preferably hydraulic, that is provided with a piston 4 and a piston rod 5 extending longitudinally of the platform. Each piston rod has a mold-carrying head 6 at its outer end. The two heater units shown in Fig. 4 are identical and a description of one will suffice for both. The carriage 7, provided with wheels 8 running on the platform 1, is mounted to travel toward and from the standard 2. This carriage also has a standard 9 provided with apertures 10, which receive the ends of spacer bars 11 fixed to the standard 2 and projecting outwardly therefrom. Each of the spacer bars 11 is provided with an annular shoulder 12 of greater diameter than the apertures in the standard 9, which serve to limit the movement of the carriage toward the standard 2. A mold member 13 is fixed to the head 6 carried by the piston rod 5 and a similar mold member 14 is fixed to the opposed face of the standard 9 on the carriage, and intermediate mold members 15 are connected to the mold members 13 and 14 and to each other by hinges 17, the hinges being alternately arranged on opposite sides of the mold members to permit the members to swing to open position upon movement of the carriage away from the standard 2. The hinges 17 carry partition plates 18, which separate the article receiving recess as in the adjacent molds when the molds are in closed position.

The standard 9 of the carriage carries radially movable latch bars 19 which are movable into and out of engagement with peripheral grooves 20 formed in the outer ends of the spacer bar 11 to rigidly lock the carriage against movement away from the standard 2. The latch bars 19 are connected by links 21 to arms 22 of a centrally disposed pivoted actuating member 23 so that when turning movement is imparted to an actuating member, the latch bars are simultaneously advanced or retracted.

The platform is provided with a centrally disposed longitudinally extending rack bar 24, which is preferably of sufficient length to extend beneath a carriage at each end of the platform. The carriage is moved back and forth along the platform by means of a large pinion 25 rotatably mounted on one of the axles of the carriage and meshing with the rack. The pinion 25 is driven to advance or retract the carriage by a reversible electric motor 26 which drives the pinion through a worm gearing 27 and a small pinion 28 meshing with the pinion 25. The electric motor is preferably controlled automatically to stop the carriage at a predetermined position adjacent the standard 2 and at a predetermined position at a distance from the standard 2 by a conventional automatic control unit 29 including limit and field reversing switches. The limit switches and field reversing switches may be controlled by a lever 30 pivoted on the carriage and engageable with lugs 31 at spaced points on the platform, one engaging with the lever 30 at the point where the carriage is to be stopped adjacent the standard 2 and the other engaging with the lever 29ª at the outermost position of the carriage. The motor control may also include the usual starting lever 32, by means of which the motor may be started to move the carriage in either direction.

Fluid pressure is applied to the cylinder 3 through pipes 33 and 34 leading to opposite ends of the cylinder and controlled by a suitable valve 35 so that pressure may be admitted upon either side of the piston 4. During the vulcanizing operation, the carriage 7 is locked to the standard 2 and pressure is applied to the molds from the cylinder 3. Means is also provided for supplying steam to the steam jackets of the individual molds to supply the heat for vulcanizing articles within the molds. The steam is supplied through a pipe 36 fixed to the standard 2 and a pipe 37 fixed to the mold member 13 which is carried by the head 6, and which has a telescopic connection with the pipe 36. The pipe 37 communicates with a cored out passage 38 in the section 13 which communicates with a steam chamber 39 in the section 13 and with passage 39 formed in the upper knuckle of the hinge 17 that connects the mold member 13 with the next adjacent mold member. Each of the mold members is provided with cored out passages 38 and each mold member communicates with the next through its connecting hinge. Each mold member is provided with channels in which the articles to be vulcanized are to be placed and, as shown herein, these channels are of annular form to receive bead rings. Each of the mold members is provided with a cored drain passage 42 communicating with a steam chamber 38 and these drain passages communicate with each other through passages 42 formed in the lower knuckles of the hinges 17. The mold member 13 is attached to the head 6. A pipe 43, which communicates with drain passage 42, is telescopically connected to a fixed drain pipe 44 carried by the standard 2.

For actuating the latch bars 19, the standard 9 carries a solenoid 45, that is actuated in one direction by a suitable spring and in the other direction by a magnetic energy. The solenoid has one terminal connected to leads 46 of a source of current supply and the other terminal connected to contact member 47 that is carried by the head 6 and that cooperates with contact member 48 that is mounted on the standard 2. Contact member 48 is connected to the lead 49 of the source of current supply. The solenoid has a core 51, which is connected to the actuating member 23 and serves, when the solenoid is energized, to move the actuater in a direction to release the latch bars 19 from the spacer bars 11 and hold the same in released positions. The solenoid core 51 is acted upon by a spring 53, which moves the core in a direction to move the latch bars 19 to engaging positions whenever the solenoid is de-energized.

In the operation of the heater unit, the carriage is latched to the standard 2 and pressure is applied through the cylinder 3 to clamp the molds between the head 6 and the standard 9 of the carriage. After the vulcanization is completed, the valve 35 is actuated to relieve the pressure upon the inner side of the piston 4 and supply pressure to the outer side thereof, which causes the piston rod 5 to be drawn into the cylinder. This causes the mold members to be pulled apart or broken open slightly prior to the opening of the molds by travel of the carriage. The head 6, in moving towards the standard 2, brings the contact members 47 and 48 into engagement thereby energizing the solenoid and releasing the latches so that the carriage is free to be moved outwardly to open the molds. During the outward movement of the carriage and until the carriage is returned again to the position shown in Fig. 1, pressure is maintained upon the outer side of the piston 4 so that the contact members 47 and 48 are maintained in engagement and the solenoid remains energized to hold the latch members in retracted position during the outward and returned movements of the carriage, so that the latch members are maintained in a position clear of the spacer bars 11 during movements of the carriage.

It is also desirable that means be provided for preventing closing the motor circuit while the carriage is locked against movement and to this end, solenoid core 51 carries a contact member 54 which, when the latch arms are fully retracted, is brought into engagement with a contact member 55 carried by the head 6. The contact members 54 and 55 are connected in series with one lead of the motor control circuit that is otherwise conventional and that is connected to terminals 56 and 57 of the system shown in Fig. 3.

Since current is supplied to the motor circuit through the contacts 54 and 55, which are in engagement only when the latches are retracted, the motor cannot be operated except when the solenoid is energized and the carriage released from the standard 2. During movement of the carriage, the contacts 47 and 48 are held in engagement by the fluid pressure in the cylinder 3, which is maintained upon the outer side of the piston 4 at all times except when pressure is being applied to the molds, so that the motor may be operated subject to the control of the limit switches and manual controller. After the molds have been charged and the carriage has been brought to the position shown in Fig. 1, the valve 35 is actuated to admit pressure to the outer end of the cylinder 3, whereupon the head 6 starts to move away from the standard 2, disengaging the contact members 47 and 48 and de-energizing the solenoid, whereupon the latch members 19 are moved into engagement with the spacer bars 11 by the spring 53 before substantial pressure is brought against the carriage 7. In this manner the carriage is automatically locked to the standard to withstand the hydraulic pressure exerted on the molds.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A vulcanizing heater comprising a series of mold members hingedly connected to one another to fold into a pack, partition plates interposed between the mold members and relatively movable supports connected to the endmost mold members.

2. A vulcanizing heater comprising a support, a carriage mounted for movement on the support, a pressure applying ram, and a series of hingedly connected molds interposed between the carriage and the ram.

3. A vulcanizing apparatus comprising a fixed support, a cylinder carried by the support and having a pressure applying head, a mold member fixed to the head, a carriage mounted for movement toward and away from said support, a mold member fixed to the carriage, intermediate mold members hinged to each other and to the mold members on said head and carriage, means for locking the carriage to said support, and means for actuating the carriage to move the same away from the support.

4. A vulcanizing apparatus comprising a fixed support, a hydraulic cylinder carried by the support and having a pressure applying head, a mold member fixed to the head, a carriage mounted for movement toward and away from said support, a mold member fixed to the carriage, intermediate mold members hinged to each other and to the mold members on said head and carriage, means for locking the carriage against movement, a motor on the carriage for propelling the same toward and away from said support, and means controlled by the carriage locking means for preventing operation of said motor when the carriage is locked.

5. A vulcanizing apparatus comprising an elongated platform having a support standard at each end, a cylinder carried by each standard, each cylinder having a pressure applying head, two carriages on the platform each movable toward and away from one of said heads, a series of hingedly connected molds interposed between each carriage and head, the endmost molds of each series being connected to the pressure applying head and carriage respectively, said platform being of a length to permit either carriage to be moved away from its pressure applying head a sufficient distance to open the molds while the other carriage is adjacent its pressure applying head.

6. A vulcanizing apparatus comprising a fixed support, a pressure cylinder carried by the support and having a pressure applying head, a carriage mounted for movement toward and away from the support, means for locking the carriage to the support to receive the pressure of said head, hingedly connected mold members interposed between the carriage and head, means for retracting the head to break the molds apart, and means for actuating the carriage to open the molds.

7. A vulcanizing apparatus comprising a fixed support, a pressure cylinder carried by the support and having a pressure applying head, a carriage mounted for movement toward and away from the support, means for locking the carriage to the support to receive the pressure of said head, hingedly connected mold members interposed between the carriage and head, means for retracting the head to break the molds apart, means for actuating the carriage to open the molds, and means preventing operation of the carriage except when the piston of said pressure applying cylinder is retracted.

In testimony whereof I affix my signature.

HAROLD A. DENMIRE.